(12) United States Patent
Zhao et al.

(10) Patent No.: US 11,092,853 B2
(45) Date of Patent: Aug. 17, 2021

(54) LIQUID CRYSTAL DISPLAY PANEL OF ADVANCED SUPER DIMENSION SWITCH MODE COMPRISING A PIXEL ELECTRODE, A PLURALITY OF FIRST ELECTRODES, AND A CONTROL ELECTRODE, DISPLAY DEVICE AND DRIVING METHOD THEREOF

(71) Applicants: BOE TECHNOLOGY GROUP CO., LTD., Beijing (CN); Chongqing BOE Optoelectronics Technology Co., Ltd., Chongqing (CN)

(72) Inventors: Yanli Zhao, Beijing (CN); Xiaoji Li, Beijing (CN); Keguo Liu, Beijing (CN); Xiuzhu Tang, Beijing (CN); Xiaolong Liu, Beijing (CN); He Sun, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 505 days.

(21) Appl. No.: 15/935,183

(22) Filed: Mar. 26, 2018

(65) Prior Publication Data
US 2019/0041703 A1    Feb. 7, 2019

(30) Foreign Application Priority Data

Aug. 4, 2017   (CN) .......................... 201710662613.5

(51) Int. Cl.
*G02F 1/1337*   (2006.01)
*G02F 1/1343*   (2006.01)
(Continued)

(52) U.S. Cl.
CPC ...... *G02F 1/133707* (2013.01); *G02F 1/1337* (2013.01); *G02F 1/13306* (2013.01);
(Continued)

(58) Field of Classification Search
CPC .......... G02F 2201/128; G02F 2202/02; G02F 2001/133749; G02F 2203/30;
(Continued)

(56) References Cited

U.S. PATENT DOCUMENTS 6,469,765 B1    10/2002   Matsuyama et al.
2006/0151202 A1*   7/2006   Das ........................ H01G 4/206
                                                   174/256

(Continued)

FOREIGN PATENT DOCUMENTS

CN          1363852 A     8/2002
CN          1688920 A     10/2005
(Continued)

OTHER PUBLICATIONS

First Office Action for Chinese Patent Application No. 201710662613.5 dated Jul. 25, 2019.

*Primary Examiner* — Paul C Lee
(74) *Attorney, Agent, or Firm* — Calfee, Halter & Griswold LLP

(57) ABSTRACT

The present disclosure relates to a display device, a liquid crystal display panel and a driving method for a liquid crystal display panel. The liquid crystal display panel includes: an array substrate including a plurality of sub-pixels having active display areas, each of the sub-pixels including a plurality of first electrodes, and a first slit being disposed between adjacent first electrodes; an opposite substrate facing the array substrate, wherein a first surface of the opposite substrate facing the array substrate includes at least a target area facing an edge area of the active display area;

(Continued)

and a control electrode disposed in the target area and opposite to the first electrode, for generating an electric field in a target direction with the first electrode, so as to control liquid crystals between an edge area of the array substrate and the target area of the opposite substrate to be deflected.

16 Claims, 4 Drawing Sheets

(51) Int. Cl.
    *G02F 1/1333*     (2006.01)
    *G02F 1/133*     (2006.01)
    *G02F 1/1362*     (2006.01)

(52) U.S. Cl.
    CPC .... *G02F 1/13439* (2013.01); *G02F 1/133345* (2013.01); *G02F 1/134309* (2013.01); *G02F 1/134363* (2013.01); *G02F 1/134345* (2021.01); *G02F 1/134372* (2021.01); *G02F 1/136286* (2013.01); *G02F 2201/123* (2013.01); *G02F 2202/02* (2013.01); *G02F 2203/30* (2013.01)

(58) Field of Classification Search
    CPC ........ G02F 2001/134345; G02F 2001/134372; G02F 1/134372
    See application file for complete search history.

(56) References Cited

U.S. PATENT DOCUMENTS

| | | | | |
|---|---|---|---|---|
| 2008/0073109 A1* | 3/2008 | Honjo | ............ | H05K 1/0231 174/258 |
| 2010/0020283 A1* | 1/2010 | Suzuki | ............ | G02F 1/134363 349/141 |
| 2011/0249229 A1* | 10/2011 | Kubota | ............ | G02F 1/133707 349/141 |
| 2013/0083264 A1* | 4/2013 | Hagiwara | ............ | G02B 5/201 349/42 |

FOREIGN PATENT DOCUMENTS

| CN | 102162949 | A | | 8/2011 |
|---|---|---|---|---|
| CN | 202285073 | U | | 6/2012 |
| CN | 102736331 | A | | 10/2012 |
| CN | 202522819 | U | | 11/2012 |
| CN | 102918451 | A | | 2/2013 |
| CN | 103718092 | A | | 4/2014 |
| CN | 105204245 | A | | 12/2015 |
| CN | 106681039 | A | * | 5/2017 |
| CN | 106681039 | A | | 5/2017 |

\* cited by examiner

LIQUID CRYSTAL DISPLAY PANEL OF ADVANCED SUPER DIMENSION SWITCH MODE COMPRISING A PIXEL ELECTRODE, A PLURALITY OF FIRST ELECTRODES, AND A CONTROL ELECTRODE, DISPLAY DEVICE AND DRIVING METHOD THEREOF

CROSS-REFERENCE TO RELATED APPLICATIONS

This application is based on and claims priority to Chinese Patent Application No. 201710662613.5, filed on Aug. 4, 2017, the entire contents thereof are incorporated herein by reference.

TECHNICAL FIELD

The disclosure relates to the technical field of liquid crystal display, and in particular, to a display device, a liquid crystal display panel and a driving method for a liquid crystal display panel.

BACKGROUND

With popularization of liquid crystal display panels, the requirements on liquid crystal display panels are getting higher and higher. An Advanced Super Dimension Switch (ADS) mode for a liquid crystal display panel is a mode in which liquid crystals are deflected by a lateral electric field generated by a pixel electrode and a common electrode in the same array substrate to realize image display. Among them, a High-aperture Advanced Super Dimension Field Switching (HADS) mode for a liquid crystal display panel is widely used due to its wide viewing angle. In the conventional array substrate of the HADS liquid crystal display panel, grooves in an alignment film can align liquid crystals at a predetermined angle.

When an oblique force is exerted on the panel to cause a spacer to scratch the alignment film, the deflection angle of the liquid crystals may be disturbed, resulting in change of transmittance and light leakage. Since the spacers are usually placed on the color filter substrate above gate lines of blue sub-pixels, the edges of the alignment film corresponding to the blue sub-pixels are easily scratched to form blue spots. In the related art, it is generally to increase the backlight intensity or improve the handling, to optimize the oblique force caused by handling equipment, but the effect is not satisfactory.

It should be noted that the information disclosed in the above background section is only for the enhancement of understanding of the background of the present disclosure and therefore can include other information that does not form the prior art that is already known to one of ordinary skill in the art.

SUMMARY

An object of the present disclosure is to provide a display device, a liquid crystal display panel, and a driving method for a liquid crystal display panel.

According to one aspect of the present disclosure, there is provided a liquid crystal display panel, comprising:

an array substrate comprising a plurality of sub-pixels having active display areas, each of the sub-pixels comprising a plurality of first electrodes, and a first slit being disposed between adjacent first electrodes;

an opposite substrate facing the array substrate, and a first surface of the opposite substrate facing the array substrate comprising at least a target area facing an edge area of the active display area; and a control electrode disposed in the target area and opposite to the first electrode, for generating an electric field based on an input voltage in a target direction with the first electrode, so as to control liquid crystals between an edge area of the array substrate and the target area of the opposite substrate to be deflected.

As an example, the first electrodes may be strip-shaped electrodes or V-shaped electrodes.

In an exemplary embodiment of the present disclosure, the control electrode comprises:

a plurality of second electrodes in a one-to-one correspondence with the first electrodes, and an extending direction of the second electrodes being parallel to the extending direction of the first electrodes, second slits being disposed between adjacent second electrodes, and each second slit corresponds to each first slit in a one-to-one correspondence.

As an example, the second electrodes may be strip-shaped electrodes or V-shape electrodes.

In an exemplary embodiment of the present disclosure, the control electrode covers the target area, and the control electrode has a plurality of conductive ribs, and the plurality of ribs correspond to the first slits in a one-to-one correspondence.

In an exemplary embodiment of the present disclosure, the opposite substrate further comprises:

a plurality of insulators disposed in the target area, the control electrodes are configured to cover the insulators and be lifted by the insulators respectively in areas covering the insulators so as to form the plurality of conductive ribs.

In an exemplary embodiment of the present disclosure, a material of the insulator is a mixture of barium titanate and polyimide.

In an exemplary embodiment of the present disclosure, the volume content of the barium titanate in the material of the insulator is 30%-60% and the dielectric constant thereof is 20-30.

In an exemplary embodiment of the present disclosure, the second slit has a width of 1 μm to 6 μm.

In an exemplary embodiment of the present disclosure, the edge region is an area within 0-60 μm from an edge of the active display area.

In an exemplary embodiment of the present disclosure, the liquid crystal display panel further comprises:

a liquid crystal layer disposed between the array substrate and the opposite substrate, wherein an angle between an initial alignment of the liquid crystals in the liquid crystal layer and the extending direction of the first electrodes is 7° to 11°.

According to one aspect of the present disclosure, there is provided a display device comprising the liquid crystal display panel as aforesaid.

According to one aspect of the present disclosure, there is provided a driving method for a liquid crystal display panel, applied to the liquid crystal display panel as aforesaid. The driving method comprising:

in a first display state, applying a first voltage to a pixel electrode of the array substrate and grounding the first electrodes, to generate an electric field in a first direction between the array substrate and the opposite substrate; and in a second display state, grounding both the first electrode and the pixel electrode and applying a second voltage to the control electrode, to generate an electric field in a second direction between the array substrate and the opposite substrate, the second direction being the target direction.

According to the display device, the liquid crystal display panel and the driving method for the same of the present disclosure, a plurality of control electrodes facing first electrodes are provided in the target area of the opposite substrate.

In the first display state, the first voltage may be applied to the pixel electrode of the array substrate, the first electrodes may be grounded, and no voltage is applied to the control electrode, to generate an electric field in the first direction between the array substrate and the opposite substrate through the pixel electrode and the first electrode, so as to deflect the liquid crystals. At this time, the display panel can normally display an image.

In the state of the 0-grayscale image, that is, in the second display state, both the first electrode and the pixel electrode may be grounded, and the second voltage may be applied to the control electrode, to generate an electric field in the second direction between the array substrate and the opposite substrate through the first electrode and the control electrode, that is an electric field in the target direction. The electric field in the second direction can cause the liquid crystals to align in a predetermined direction, and thus avoid liquid crystal disorder caused by scratch of the alignment film, to prevent changes in transmittance, which can reduce the phenomenon of blue spots and improve the display effect.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure. Apparently, the accompanying drawings in the following description illustrate merely some embodiments of the present disclosure, and persons of ordinary skill in the art may still derive other drawings from these accompanying drawings without creative efforts.

DETAILED DESCRIPTION

Figure 1:
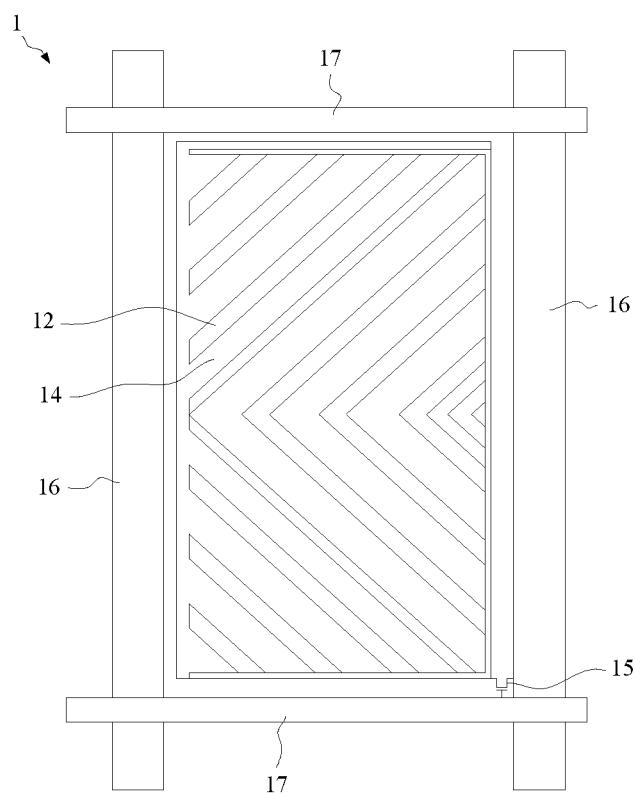
FIG. 1 is a partial top view of an array substrate of a liquid crystal display panel of the present disclosure.

Example embodiments will now be described more fully with reference to the accompanying drawings. However, example embodiments may be embodied in many forms and should not be construed as limited to the embodiments set forth herein; rather, these embodiments are provided so that this disclosure will be thorough and complete, and will fully convey the concepts of the example embodiments to those skilled in the art. The same reference numerals in the drawings denote the same or similar structures, and thus their detailed descriptions will be omitted.

Although relative terms, such as "upper" and "lower," are used in this specification to describe the relative relationship of one component illustrated to another component, and these terms are used herein for convenience only, for example, in the accompanying drawings, based on the direction of the example as illustrated in the figure. It will be appreciated that if the illustrated device is flipped so as to be upside down, the component described as "up" will be the component "down". When a structure is "on" another structure, it is possible for the structure to be integrally formed on other structures, or to dispose a structure "directly" on another structure, or to "indirectly" place a structure on another structure via another structure.

In the claims, the terms "a (an)" and "the" and "said" are intended to mean that there are one or more elements/components, and the like. The terms "include" and "have" are used to indicate that non-exclusive inclusion and mean that it is possible to have additional elements/components in addition to the listed elements/components. The terms "first", "second" and the like are used only as a token, rather than limitation to the number of the items.

An embodiment of the present disclosure provides a liquid crystal display panel. As shown in FIG. 1 to FIG. 8, the liquid crystal display panel of the present embodiment may include an array substrate 1, a first electrode 12, an opposite substrate 2, a control electrode 3 and a liquid crystal layer 4. The first electrodes may be strip-shaped electrodes or V-shape electrodes. As an example, FIG. 1 shows V-shaped electrodes, but the present disclosure is not limited thereto.

The array substrate 1 may include a plurality of sub-pixels. Each sub-pixel has an active display area and a peripheral area located at the periphery of the active display area. The active display area may have an edge area. The edge area may be an area in a range of 0~60 μm away from the edge of the active display area. But the scope of the edge region may also be greater than the above range, which is not limited to the embodiment. When there are a plurality of sub-pixels, the number of the edge regions is also multiple.

Each of the sub-pixels may include a substrate 10, a pixel electrode 11, a first electrode 12 and an insulating layer 13. The substrate 10 is a base substrate having a thin film transistor formed thereon. The pixel electrode 11 is disposed on the substrate 10. The insulating layer 13 may cover the pixel electrode 11. The first electrode 12 may be disposed on the insulating layer 13. The number of the first electrodes 12 may be multiple, and a first slit 14 is located between two adjacent first electrodes 12. The substrate 10 may include a thin film transistor 15, and the drain of the thin film transistor 15 may be connected to the pixel electrode 11. The plurality of first electrodes 12 may be distributed in a two-domain structure or the plurality of first electrodes 12 may be arranged in parallel. However, the plurality of first electrodes 12 may be arranged in other forms, which are not limited here.

In addition, the array substrate 1 may further include a plurality of data lines 16 and a plurality of gate lines 17, and the plurality of data lines 16 and the plurality of gate lines 17 intersect with each other and insulated from each other. Each of the sub-pixels corresponds to one of the multiple intersection areas of the data lines 16 and the gate lines 17 in a one-to-one correspondence. The source of the thin film transistor 15 may be connected to the data line 16. The gate of the thin film transistor 15 may be connected to the gate line 17. For other structures of the array substrate 1, reference may be made to the existing array substrate and will not be described in detail herein.

The opposite substrate 2 may be a color filter substrate. In the following embodiments of the liquid crystal display panel, only the example in which the opposite substrate 2 is a color filter substrate is illustrated. However, the opposite substrate 2 is not limited thereto, and may be other plate structure. The color filter substrate may include a base substrate, and a color filter sheet and a black matrix 5 disposed on the base substrate. The black matrix 5 may have an area capable of covering the data line 16 and the gate line 17. The structure of the color filter substrate is not limited thereto, and may further include other components, which are not described in detail herein.

Figure 2:
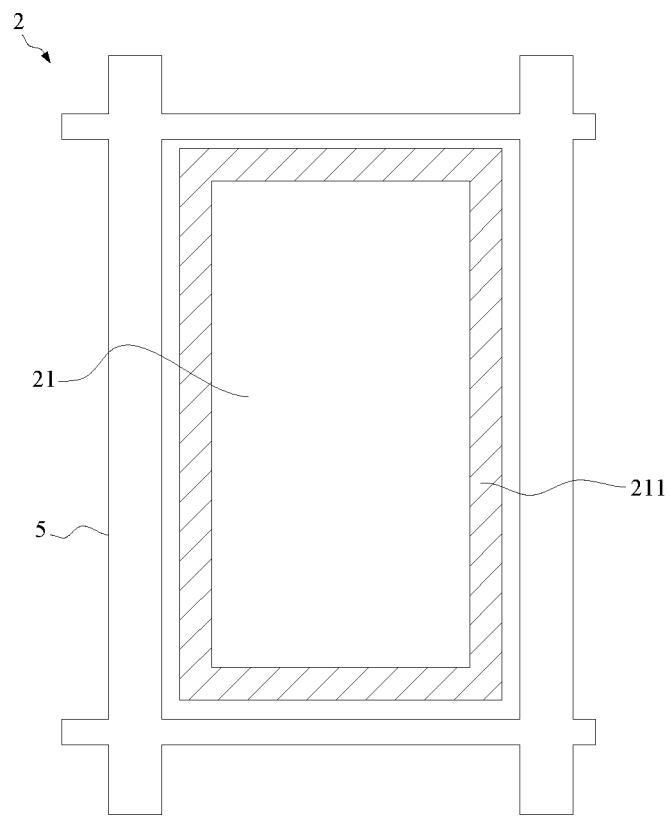
FIG. 2 is a partial bottom view of the opposite substrate of the liquid crystal display panel of the present disclosure.

As shown in FIG. 2, the color filter substrate may be disposed opposite to the array substrate 1. The color filter substrate has a first surface 21 facing the array substrate 1. The first surface 21 may be a surface of the color filter substrate facing the array substrate 1. The first surface 21 may include a target area 211 facing the above plurality of edge areas. Corresponding to the plurality of sub-pixels, the number of the target areas 211 may be the same as the number of the sub-pixels. That is, the first surface 21 may include the above plurality of target areas 211, and the plurality of target areas 211 are facing the above plurality of target areas of the sub-pixels. However, the target area 211 may also be directly facing other areas of the active display area at the same time.

The liquid crystal layer 4 can be disposed between the array substrate 1 and the color filter substrate. Under the action of the electric field between the array substrate 1 and the color filter substrate, the liquid crystals of the liquid crystal layer 4 can be deflected.

The liquid crystal display panel of the exemplary embodiment of the present disclosure may further include an alignment film and a spacer. The alignment film has a groove disposed along a predetermined direction. The predetermined direction is the initial orientation of the liquid crystals of the liquid crystal layer 4. An angle between the initial orientation of the liquid crystals and the extending direction of the first electrode 12 may be 7°~11°. That is, an angle between the direction of the groove on the alignment film and the extending direction of the first electrode 12 may be 7°~11°. However, the angle may also be greater than 7° or less than 11°, which is not limited herein. The spacer may be disposed between the array substrate 1 and the color filter substrate and within the liquid crystal layer 4. Other configurations of the liquid crystal display panel may refer to the existing liquid crystal display panel, which are not described in detail herein.

The control electrode 3 may be a transparent conductive material such as indium tin oxide or the like, or other conductive materials may also be used. The control electrode 3 may generate an electric field in a target direction with the opposite first electrode 12. There are many ways to implement the control electrode 3, as follows for example.

Figure 3:
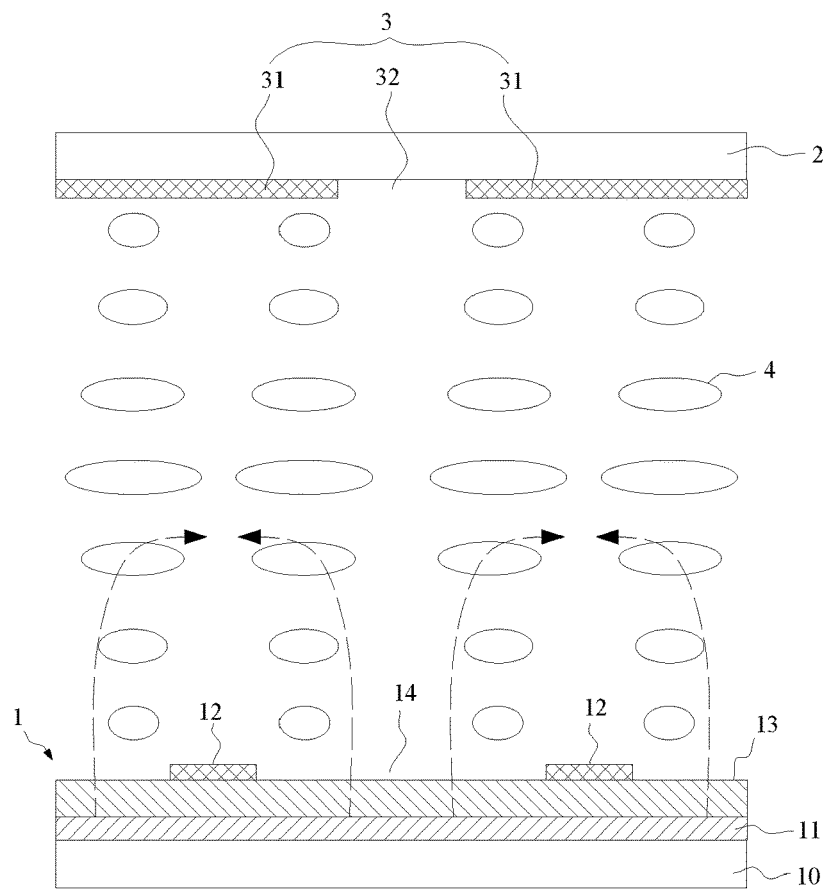
FIG. 3 is a cross-sectional view of a liquid crystal display panel in a first display state according to a first embodiment of the present disclosure.
Figure 4:
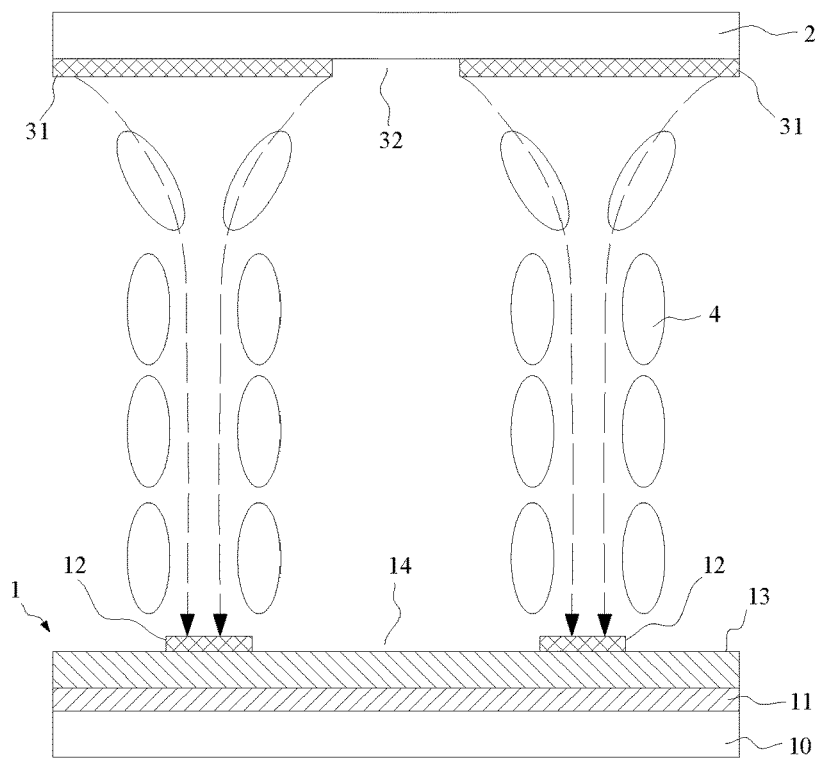
FIG. 4 is a cross-sectional view of a liquid crystal display panel in a second display state according to the first embodiment of the present disclosure.

As shown in FIG. 3 and FIG. 4, in the first embodiment of the liquid crystal display panel of the present disclosure, the control electrode 3 may include second electrodes 31. The number of the second electrodes 31 may be multiple. Each target area 211 of the color filter substrate may have a plurality of second electrodes 31. The plurality of second electrodes 31 may face the plurality of first electrodes 12 in a one-to-one correspondence, which means, for example, the projections of the second electrodes and those of the first electrodes on the color filter subject may overlap each other, and the extending direction of the plurality of second electrodes 31 may be parallel to the extending direction of the first electrodes 12. The arrangement of the second electrodes 31 may be dependent on the arrangement of the first electrodes 12. That is, the second electrodes are strip-shaped electrodes or V-shape electrodes, depending on the arrangement of the first electrodes 12. When the first electrodes 12 are stripe-shaped electrodes, the second electrodes 31 are stripe-shaped electrodes, too, and when the first electrodes 12 are V-shaped electrodes, the second electrodes 31 are V-shaped electrodes, too. A second slit 32 may be disposed between two adjacent second electrodes 31. Each second slit 32 may face each first slit 14 in a one-to-one correspondence. That is, the center line of the second slit 32 and the center line of the first slit 14 are located on the same plane perpendicular to the first surface 21. The width of the second slit 32 may be 1 μm to 6 μm, for example, 1 μm, 3 μm, 6 μm etc., but the width of the second slit 32 is not limited to the width range. The width of the second slit 32 may also less than 1 μm or greater than 6 μm.

In addition, the width of the second electrode 31 may be greater than the width of the first electrode 12, the width of the second slit 32 may be less than the width of the first slit 14, and the width of the second electrode 31 is less than the sum of the width of the electrode 12 and the width of the first slit 14. When a voltage is applied to the second electrode 31, the second slit 32 can prevent the two second electrodes 31 on two sides of the second slit 32 from being non-conductive to each other. In this case, if the first electrode 12 is grounded, the electric field in the target direction can be generated between the second electrode 31 and the first electrode 12. The direction indicated by the dotted line in FIG. 4 is the above target direction.

Figure 5:
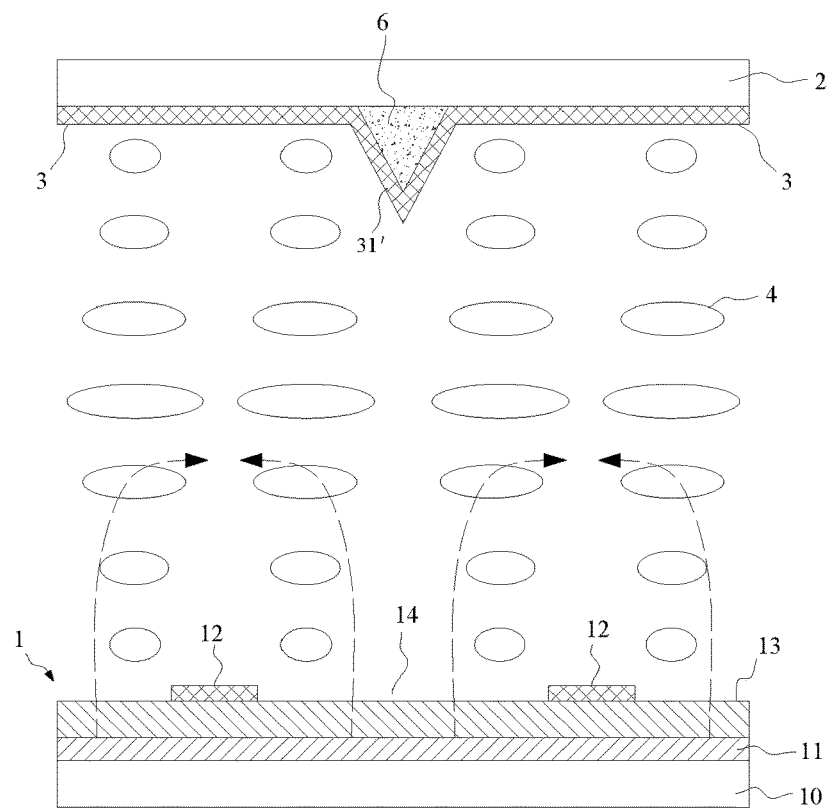
FIG. 5 is a cross-sectional view of a liquid crystal display panel in a first display state according to a second embodiment of the present disclosure.
Figure 6:
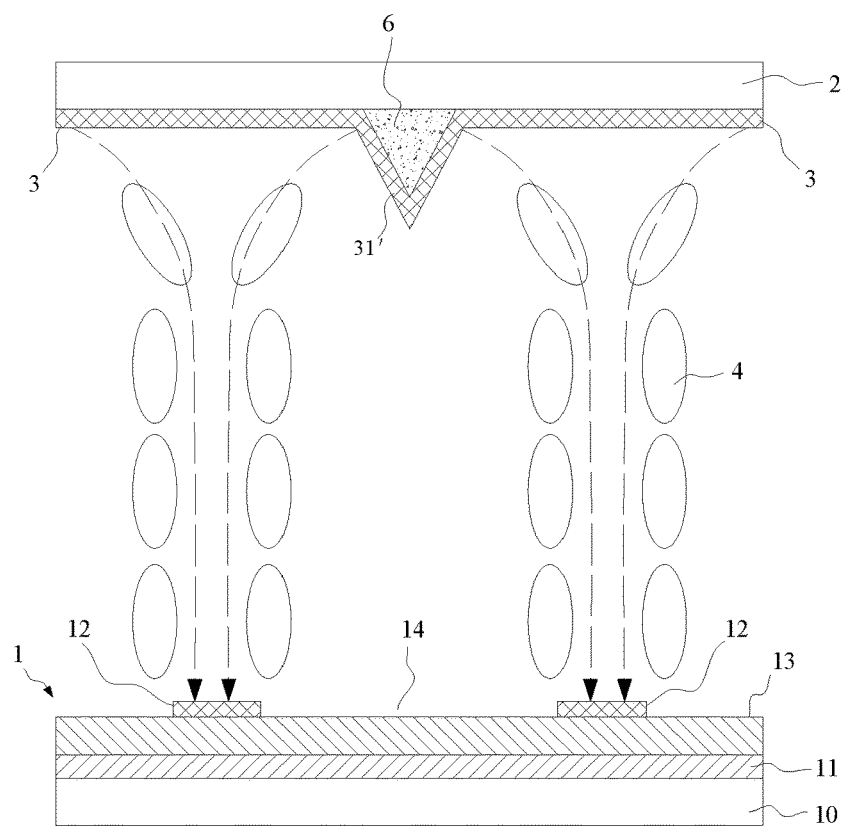
FIG. 6 is a cross-sectional view of a liquid crystal display panel in a second display state according to the second embodiment of the present disclosure.

As shown in FIG. 5 and FIG. 6, in the second embodiment of the liquid crystal display panel of the present disclosure, the liquid crystal display panel may further include a plurality of insulators 6, and the insulators 6 may be semicylindrical or triangular prism in shape, that is, the cross-section may be a semicircle, a triangle, or the like. However, the present disclosure is not limited thereto, and the insulator 6 may have other shapes. The cross-section is a cross-section in a direction perpendicular to the opposite substrate. The material of the insulator 6 may be a mixture of barium titanate and polyimide. The volume content of barium titanate may be 30-60% and the dielectric constant of the insulator may be 20-30, for example, the volume content thereof may be 50% and the dielectric constant may be 30. However, the volume content of barium titanate may not be in the range of 30%-60%, and the dielectric constant may not be in the range of 20-30. The material of the insulator 6 may also be other materials, which are not limited here.

The control electrode 3 may be a surface electrode covering the target area 211. That is, the control electrode 3 may simultaneously cover the insulator 6 and an area of the target area 211 where the insulator 6 is not disposed. The insulator 6 is higher than the first surface 21 and the area where the control electrode 3 covers the insulator 6 is higher than other areas, so that the control electrode 3 becomes an uneven structure due to the insulator 6. That is, the control electrode 3 is lifted up by the insulator 6 at the position where the control electrode 3 covers the insulator 6 to form a rib 31'. The cross section of the rib 31' may have a shape of a semicircular shape, a triangular shape or the like adapted to the insulator 6. The cross section of the rib 31' is a cross section in a direction perpendicular to the opposite substrate. At the same time, each rib 31' may correspond to each first slit 14 in a one-to-one correspondence, and any rib 31' may face the center of the corresponding first slit 14. The rib 31' may has a shape matching the insulator 6. When a voltage is applied to the control electrode 3 and the first electrode 12 is grounded, an electric field in the above target direction can be generated between the first electrode 12 and the control electrode 3 having the rib 31'. The direction indicated by the dotted line in FIG. 6 is the above target direction.

Figure 7:
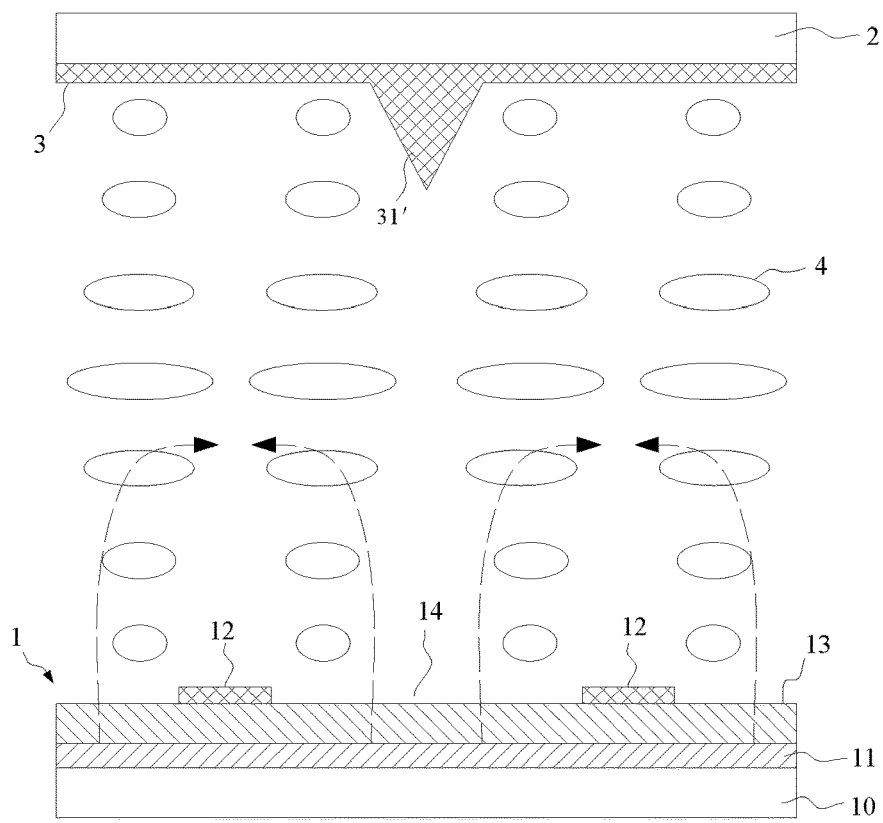
FIG. 7 is a cross-sectional view of a liquid crystal display panel in a first display state according to a third embodiment of the present disclosure.
Figure 8:
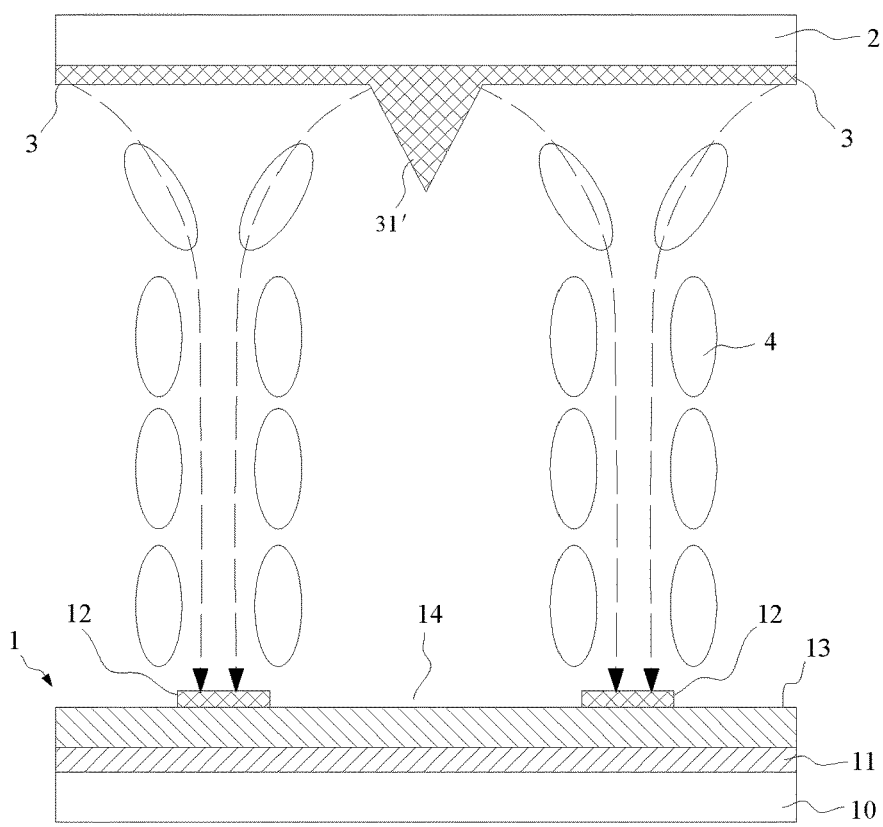
FIG. 8 is a cross-sectional view of a liquid crystal display panel in a second display state according to the third embodiment of the present disclosure.

As shown in FIG. 7 and FIG. 8, in the third embodiment of the liquid crystal display panel of the present disclosure, referring to the above second embodiment, the insulator 6 may not be disposed in the target area 211, and the control electrode 3 may completely cover the target area 211 and laminated to the color filter substrate. At the same time, the plurality of ribs 31' may be a plurality of structures protruding toward the array substrate 1 and formed on the surface of the control electrode 3 facing the array substrate 1. That is, a plurality of partial areas (that is the ribs 31') on the control electrode 3 have thickness greater than that of the other areas. Meanwhile, the shape of the cross section of each rib 31' may be semicircular or triangular shape or the like, and the cross section is a cross section in a direction perpendicular to the opposite substrate. The direction shown by the dotted line in FIG. 8 is the above-mentioned target direction.

It should be noted that the control electrode 3 is not limited to what is described in the above embodiments, and other configurations may be adopted, which are not limited herein.

The exemplary embodiment of the present disclosure further provides a display device. The display device in this embodiment may include the liquid crystal display panel in any one of the above embodiments. For other configurations of the display device of the present embodiment, reference may be made to the existing display device, and details are not described herein again.

An exemplary embodiment of the present disclosure further provides a driving method of a liquid crystal display panel applied to the liquid crystal display panel in any one of the above embodiments. The driving method of this embodiment may include the following steps.

In a first display state, a first voltage is applied to the pixel electrode 11 of the array substrate 1, and the first electrode 12 is grounded, so as to generate an electric field in a first direction between the array substrate 1 and the opposite substrate 2. The electric field in the first direction is the electric field generated between each first electrode 12 and the respective pixel electrode 11. The first direction may refer to the directions shown by the arrows in FIGS. 3, 5, and 7.

In a second display state, both the first electrode 12 and the above pixel electrode 11 are grounded, and a second voltage is applied to the control electrode 3 to generate an electric field in a second direction between the array substrate 1 and the opposite substrate 2. The electric field in the second direction is the electric field generated between each first electrode 12 and the respective control electrode 3. The second direction is the target direction in the above embodiments of the liquid crystal display panel, and the second direction may refer to the directions shown by the arrows in FIGS. 4, 6, and 8.

In the present embodiment, the first display state may be a state of a normal display screen, and the second display state may be a state of displaying a 0-grayscale screen.

In the present embodiment, the size of the first voltage is not particularly limited herein, as long as a voltage difference can be generated between the pixel electrode 11 and the first electrode 12, so as to generate an electric field in the first direction between the array substrate 1 and the opposite substrate 2. The value of the second voltage is not particularly limited here, as long as a voltage difference can be generated between the control electrode 3 and the first electrode 12, so as to generate an electric field in the second direction between the array substrate 1 and the opposite substrate 2.

In the present embodiment, the first direction is different from the second direction, and the electric field in the first direction can make the liquid crystals deflect in the plane parallel to the array substrate 1, to realize the fringe field effect driving for displaying an image. The electric field in the second direction can make the liquid crystals align in a direction perpendicular to the array substrate 1, so as to prevent the liquid crystal from being disordered.

In the display device, the liquid crystal display panel and the driving method for the liquid crystal display panel according to the exemplary embodiments of the present disclosure, in a normal image display state, the first voltage may be applied to the pixel electrode 11 of the array substrate 1, the first electrodes 12 may be grounded, and no voltage is applied to the control electrode 3, so as to generate an electric field in the first direction between the array substrate 1 and the opposite substrate 2 through the pixel electrode 11 and the first electrode 12, so as to deflect the liquid crystals.

In the state of the 0-grayscale image, that is, in the second display state, both the first electrode 12 and the pixel electrode 11 may be grounded, and the second voltage may be applied to the control electrode 3, to generate an electric field in the second direction between the array substrate 1 and the opposite substrate 2 through the first electrode 12 and the control electrode 3. The electric field in the second direction can align the liquid crystals in a predetermined direction, and thus avoid liquid crystal disorder caused by scratch of the alignment film, and prevent changes in transmittance, which can improve the phenomenon of blue spots and improve the display effect.

Other embodiments of the present disclosure will be apparent to those skilled in the art from consideration of the specification and practice of the present disclosure disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the present disclosure being indicated by the following claims.

What is claimed is:

1. A liquid crystal display panel of advanced super dimension switch (ADS) mode, comprising:
an array substrate, comprising a plurality of sub-pixels having active display areas, wherein each of the sub-pixels comprises a substrate, a pixel electrode, a plurality of first electrodes and an insulating layer, the pixel electrode is disposed on the substrate, the insulating layer covers the pixel electrode, the plurality of first electrodes are disposed on the insulating layer, and a first slit is disposed between adjacent first electrodes;

an opposite substrate, facing the array substrate, wherein a first surface of the opposite substrate facing the array substrate comprises at least a target area facing an edge area of the active display area, and wherein the opposite substrate further comprises a plurality of insulators disposed in the target area; and a control electrode, disposed in the target area and opposite to the first electrode, for generating an electric field based on an input voltage in a target direction with the first electrode, so as to control liquid crystals between an edge area of the array substrate and the target area of the opposite substrate to be deflected, wherein the control electrode is a surface electrode that simultaneously covers the plurality of insulators and an area of the target area where none of the plurality of insulators is disposed, the plurality of insulators are higher than the first surface, areas where the control electrode covers the plurality of insulators are higher than the area of the target area where none of the plurality of insulators is disposed, the control electrode is lifted up by the plurality of insulators at the positions where the control electrode covers the plurality of insulators to form a plurality of conductive ribs, and the plurality of conductive ribs correspond to the first slits in a one-to-one correspondence, wherein the first electrodes are disposed between the control electrode and the pixel electrode in a direction perpendicular to the array substrate and the opposite substrate, the control electrode covers the target area corresponding to the edge area of the active display area, and the electric field generated by the control electrode controls the liquid crystals between the edge area of the array substrate and the target area of the opposite substrate to be deflected to display a state of 0-gray-scale screen, so as to prevent the liquid crystals from being disordered caused by scratch of an alignment film.

2. The liquid crystal display panel according to claim 1, wherein the first electrodes are strip-shaped electrodes or V-shape electrodes.

3. The liquid crystal display panel according to claim 1, wherein the control electrode comprises:

a plurality of second electrodes in a one-to-one correspondence with the first electrodes, wherein an extending direction of the second electrodes is parallel to the extending direction of the first electrodes, a second slit is disposed between adjacent second electrodes, and each second slit corresponds to each first slit in a one-to-one correspondence.

4. The liquid crystal display panel according to claim 3, wherein the second electrodes are strip-shaped electrodes or V-shape electrodes.

5. The liquid crystal display panel according to claim 1, wherein a material of the insulator is a mixture of barium titanate and polyimide.

6. The liquid crystal display panel according to claim 5, wherein a volume content of the barium titanate in the material of the insulator is 30%-60% and a dielectric constant of the insulator is 20-30.

7. The display panel according to claim 3, wherein the second slit has a width of 1 μm to 6 μm.

8. The liquid crystal display panel according to claim 1, wherein the edge region is an area within 0-60 μm from an edge of the active display area.

9. The liquid crystal display panel according to claim 1, further comprising:

a liquid crystal layer disposed between the array substrate and the opposite substrate, wherein an angle between an initial alignment of the liquid crystals in the liquid crystal layer and the extending direction of the first electrodes is 7° to 11°.

10. A display device comprising a liquid crystal display panel of advanced super dimension switch (ADS) mode, wherein the liquid crystal display panel of advanced super dimension switch (ADS) mode comprises:

an array substrate comprising a plurality of sub-pixels having active display areas, wherein each of the sub-pixels comprises a substrate, a pixel electrode, a plurality of first electrodes and an insulating layer, the pixel electrode is disposed on the substrate, the insulating layer covers the pixel electrode, the plurality of first electrodes are disposed on the insulating layer, and a first slit is disposed between adjacent first electrodes;

an opposite substrate facing the array substrate, wherein a first surface of the opposite substrate facing the array substrate comprises at least a target area facing an edge area of the active display area, and wherein the opposite substrate further comprises a plurality of insulators disposed in the target area; and a control electrode disposed in the target area and opposite to the first electrode, for generating an electric field based on an input voltage in a target direction with the first electrode, so as to control liquid crystals between an edge area of the array substrate and the target area of the opposite substrate to be deflected, wherein the control electrode is a surface electrode that simultaneously covers the plurality of insulators and an area of the target area where none of the plurality of insulators is disposed, the plurality of insulators are higher than the first surface, areas where the control electrode covers the plurality of insulators are higher than the area of the target area where none of the plurality of insulators is disposed, the control electrode is lifted up by the plurality of insulators at the positions where the control electrode covers the plurality of insulators to form a plurality of conductive ribs, and the plurality of conductive ribs correspond to the first slits in a one-to-one correspondence, wherein the first electrodes are disposed between the control electrode and the pixel electrode in a direction perpendicular to the array substrate and the opposite substrate, the control electrode covers the target area corresponding to the edge area of the active display area, and the electric field generated by the control electrode controls the liquid crystals between the edge area of the array substrate and the target area of the opposite substrate to be deflected to display a state of 0-gray-scale screen, so as to prevent the liquid crystals from being disordered caused by scratch of an alignment film.

11. A driving method for a liquid crystal display panel of advanced super dimension switch (ADS) mode, applied to the liquid crystal display panel of advanced super dimension switch (ADS) mode comprising: an array substrate, comprising a plurality of sub-pixels having active display areas, wherein each of the sub-pixels comprises a substrate, a pixel electrode, a plurality of first electrodes and an insulating layer, the pixel electrode is disposed on the substrate, the insulating layer covers the pixel electrode, the plurality of first electrodes are disposed on the insulating layer, and a first slit is disposed between adjacent first electrodes; an opposite substrate, facing the array substrate, wherein a first surface of the opposite substrate facing the array substrate comprises at least a target area facing an edge area of the active display area, and wherein the opposite substrate further comprises a plurality of insulators disposed in the target area; and a control electrode, disposed in the target area and opposite to the first electrode, for generating an electric field based on an input voltage in a target direction with the first electrode, so as to control liquid crystals between an edge area of the array substrate and the target area of the opposite substrate to be deflected, wherein the control electrode is a surface electrode that simultaneously covers the plurality of insulators and an area of the target area where none of the plurality of insulators is disposed, the plurality of insulators are higher than the first surface, areas where the control electrode covers the plurality of insulators are higher than the area of the target area where none of the plurality of insulators is disposed, the control electrode is lifted up by the plurality of insulators at the positions where the control electrode covers the plurality of insulators to form a plurality of conductive ribs, and the plurality of conductive ribs correspond to the first slits in a one-to-one correspondence, the first electrodes are disposed between the control electrode and the pixel electrode in a direction perpendicular to the array substrate and the opposite substrate, the control electrode covers the target area corresponding to the edge area of the active display area, and the electric field generated by the control electrode controls the liquid crystals between the edge area of the array substrate and the target area of the opposite substrate to be deflected to display a state of 0-grayscale screen, so as to prevent the liquid crystals from being disordered caused by scratch of an alignment film, and wherein the driving method comprises:

in a first display state, applying no voltage to the control electrode and applying a first voltage to the pixel electrode of the array substrate and grounding the first electrode, to generate an electric field in a first direction between the array substrate and the opposite substrate, wherein the electric field in the first direction makes the liquid crystals deflect in a plane parallel to the array substrate to realize fringe field effect driving for displaying an image; and in a second display state, grounding both of the first electrode and the pixel electrode and applying a second voltage to the control electrode, to generate an electric field in a second direction between the array substrate and the opposite substrate, the second direction being the target direction, and the second voltage being the input voltage.

12. The display device according to claim 10, wherein the first electrodes are strip-shaped electrodes or V-shaped electrodes.

13. The display device according to claim 10, wherein the control electrode comprises:

a plurality of second electrodes in a one-to-one correspondence with the first electrodes, wherein an extending direction of the second electrodes is parallel to the extending direction of the first electrodes, a second slit is disposed between adjacent second electrodes, and each second slit corresponds to each first slit in a one-to-one correspondence.

14. The display device according to claim 13, wherein the second electrodes are strip-shaped electrodes or V-shaped electrodes.

15. The display device according to claim 10, wherein a material of the insulator is a mixture of barium titanate and polyimide.

16. The display device according to claim 15, wherein a volume content of the barium titanate in the material of the insulator is 30%-60% and a dielectric constant of the insulator is 20-30.

* * * * *